Figure 1:
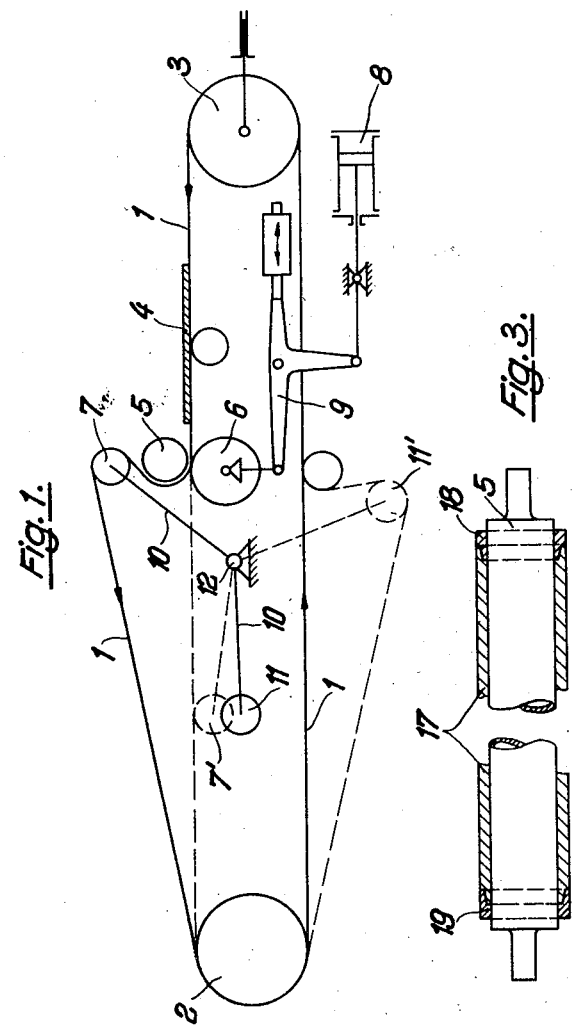

April 23, 1957 W. FUHRMANN 2,789,333
APPARATUS FOR MANUFACTURING TUBES
Filed May 11, 1954 2 Sheets-Sheet 1

Inventor:
WILHELM FUHRMANN
By HIS ATTORNEYS,
Howson and Howson.

April 23, 1957     W. FUHRMANN     2,789,333
APPARATUS FOR MANUFACTURING TUBES
Filed May 11, 1954     2 Sheets-Sheet 2

Inventor:
WILHELM FUHRMANN
BY HIS ATTORNEYS
Howson and Howson.

United States Patent Office 2,789,333
Patented Apr. 23, 1957

2,789,333

APPARATUS FOR MANUFACTURING TUBES

Wilhelm Fuhrmann, Duisburg-Huckingen, Germany, assignor to Mannesmann Aktiengesellschaft, Dusseldorf, Germany, a German company Application May 11, 1954, Serial No. 429,075

7 Claims. (Cl. 25—30)

The invention relates to an apparatus for the manufacture of tubes from substances which harden or set under certain conditions for example, concrete, fibre-cement mixtures and the like. In this connection, as known per se, the quantity of wet material required for the manufacture of a tube is supplied to a core roller by a conveyor belt supported by guide rollers and tensioning rollers. Heretofore in the manufacture of fibre-cement tubes, the mixture of material was sometimes wound in several thin layers on to the core roller. However, this is not suitable for the manufacture of concrete tubes.

It has also been proposed for a batch of wet material, for example, concrete, to be applied to the core roller during a single rotation, the layer thickness corresponding substantially to the wall thickness of the completed tube, and to wrap the tube while being formed in a web of material. That method required a second working operation, using a second machine, in order to impart to the preliminary product the necessary firmness.

The present invention is concerned with a process which is suitable equally for the manufacture of tubes from fibre-cement mixtures and for the manufacture of concrete tubes and which requires only a single apparatus for the manufacture of the tubes.

The process consists in the combination of the following features:

(a) The batch of wet material required for the manufacture of a tube is supplied in a flat continuous length corresponding in width to the length of the tube to a core roller by means of a conveyor belt. The belt is guided by tensioning and guide rollers. The material is applied to the core roller with one or even a few revolutions of the latter, (b) After application to the core roller has been completed, the material on the roller is compacted in the course of a few more revolutions by gradual adjustment of a pressure roller towards the core roller and is thereby brought to the wall thickness of the finished tube, (c) While the material is being applied to the roller and compacted, the tube is maintained below atmospheric pressure by using an evacuated core roller.

The apparatus for carrying the process into effect consists of an endless porous conveyor belt, a core roller connected to a means for producing reduced pressure, a pressure roller associated with and arranged beneath the core roller and a tensioning roller arranged above the latter. This tensioning roller is capable of being moved, for example, swung out from its tensioning position in a direction normal to its axis. The movement is preferably effected until the roller is located in a plane which is below the plane of the conveyor belt in the region where it enters the gap between the pressure roller and the core roller.

Another feature consists in the arrangement of a second tensioning roller which moves with the first tensioning roller and engages the belt to provide tension thereof. When the first tensioning roller moves from and relieves its tensioning action from the belt, preferably the second tensioning roller will engage the opposite run of the belt from the first so as to maintain the tension of the conveyor belt.

Yet another feature consists in that the tensioning rollers are mounted at the ends of elbow levers which are adapted to pivot about a common axis.

The pivotal movement of the pair of tensioning rollers results in a shortening of the upper run and a corresponding lengthening of the bottom run of the conveyor belt and thus in a restricted movement of the conveyor belt led around the driving roller.

In order that it should not be necessary for the drive of the conveyor belt to be temporarily set in operation during the steps which take place after the finishing of a tube, it is proposed according to the invention to provide coupling means between the driving roller of the conveyor belt and its drive means, which coupling means will permit a turning movement of the driving roller in the conveying direction, even when the drive means are stopped. The coupling between the drive means and the driving roller is preferably constructed as an overrunning clutch. Alternatively, it is also possible to provide an engageable and disengageable clutch, for example, a magnetic clutch, the shifting movement of the clutch advantageously being derived automatically from the rocking movements of the two tensioning rollers.

The apparatus or parts of this apparatus as above described are capable of being used not only for the manufacture of single-layer tubes, but also in like manner for the manufacture of tubes which consist of two or more layers. The individual layers may consist of different mixtures or of mixtures of substances having different proportions or properties. The separate layers are applied successively to the core roller, starting with the inner layer, and then compacted.

The invention is illustrated by way of example with reference to the three figures in the drawing.

Figure 2:
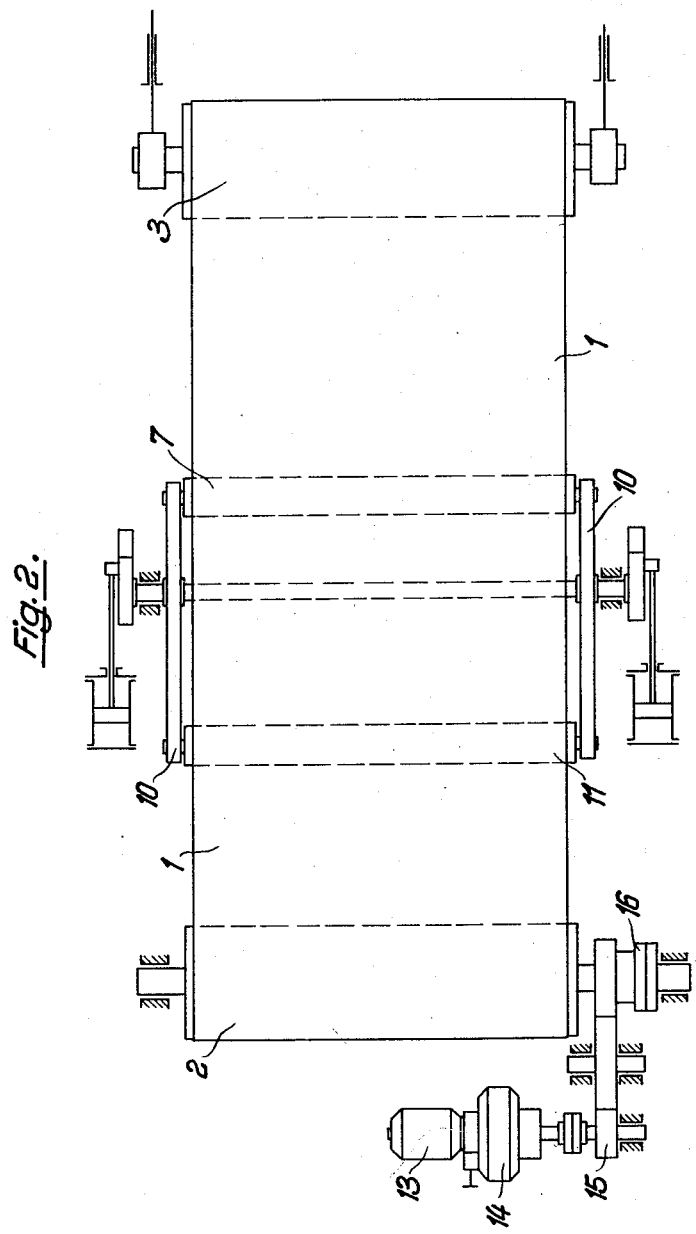

Figure 1 is a side elevation showing diagrammatically the invention as applied to an apparatus for the manufacture of tubes, Figure 2 is a diagrammatic plan view of an installation according to Figure 1, with the addition of drive means for the driving roller of the conveyor belt, Figure 3 shows the core roller with a tube and limiting rings.

The rotating endless and porous conveyor belt 1 is set in rotation by the driving roller 2. The main tensioning roller for the conveyor belt is indicated at 3. The conveyor belt travels, with the quantity of material 4 placed thereon, into the gap between the fixedly mounted core roller 5 and the pressure roller 6 located beneath the latter. Provided above the core roller 5 is a tensioning roller 7, which in the operative position as illustrated, ensures the necessary wrapping of the core roller 5 by the conveyor belt 1. The pressure roller 6 is gradually started with the rotation of the core roller for the purpose of consolidating the tube; for this purpose, there is employed the pressure cylinder 8, the force of which is adjustable and which is transmitted through the double lever 9 to the pressure roller 6. While the consolidation is being effected by the application of the pressure roller, the core roller 5, of which the casing is permeable to air and water, is at the same time kept below atmospheric pressure. After the completion of the manufacture of the tube, the tensioning roller 7 is moved away from its position to enable the core roller to be removed with the tube. In the constructional example which is illustrated, the tensioning roller 7 is mounted on one arm of a bell crank or elbow lever 10; on the end of the other arm of said lever 10 another tensioning roller 11 is mounted. When the tensioning roller 7, by rocking the elbow lever counter-clockwise as viewed in the drawing, has reached the position 7' shown in broken lines, the auxiliary tensioning roller 11 will have engaged the lower run of the conveyor belt and will have reached the position 11', also shown in broken lines. In that way the tension of the conveyor belt is maintained.

The rocking of the pair of tensioning rollers 7, 11 about the common pivot axis 12 is effected as soon as the tube is completed and the machine is stopped. Then the completed tube and the core roller 5 are removed from the machine. As a result of rocking the pair of tensioning rollers 7, 11 into the positions 7', 11' shown in broken lines, there is produced a shortening of the upper run of the conveyor belt and a corresponding lengthening of the lower run. For this purpose, a slight turning movement of the driving roller is necessary if the belt is not to slip on the said roller. For this purpose, the driving roller 2 is uncoupled from its drive means. The drive in the example according to Figure 2 is provided by the motor 13 by way of the infinitely variable gear 14 and the pinion 15. Mounted on the shaft of the driving roller 2 is the clutch 16, which is constructed as an overrunning clutch or as an engageable or disengageable clutch, for example, as a magnetic clutch.

Figure 3 shows the core roller 5 with the tube 17 rolled thereon. It will further be seen that the core roller 5 carries at both ends limiting rings 18, 19 which are formed with tongue and groove profiles.

While there is disclosed and described herein a preferred embodiment of the apparatus for manufacturing tubes in accordance with the invention it is to be understood that alterations can be made in this apparatus without departing from the spirit of the invention and that these modifications that fall within the scope of the appended claims are intended to be included herein.

What is claimed is:

1. Apparatus for the manufacture of tubes from plastic substances which harden, comprising a conveyor belt, a hollow core-roller, a pressure roller pressing the belt and the substance thereon against the core-roller, a tensioning roller pressing on said belt to apply tension thereto during formation of the tube, a second tensioning roller adapted to engage said belt, and means mounting said tensioning rollers for movement jointly, said second tensioning roller engaging with said belt and imposing tension thereon when said first tensioning roller moves to relieve tension.

2. Apparatus as claimed in claim 1 in combination with roller means to drive said belt, and clutch means which becomes inactive when the driving action ceases, thereby permitting the roller means to be rotated in driving direction when the driving action has stopped.

3. Apparatus as claimed in claim 1 wherein the roller mounting means comprises a pivoted lever on the opposite arms of which said two tensioning rollers are mounted.

4. Apparatus as claimed in claim 3 wherein at least one tensioning roller engages the inside of the conveyor belt.

5. Apparatus as claimed in claim 4 wherein one tensioning roller engages the opposite run of the conveyor belt from the other.

6. Apparatus as claimed in claim 1 wherein at least one tensioning roller engages the inside of the conveyor belt.

7. Apparatus as claimed in claim 1 wherein one tensioning roller engages the opposite run of the conveyor belt from the other.

References Cited in the file of this patent

UNITED STATES PATENTS

| | | |
|---|---|---|
| 1,670,855 | Herzog | May 22, 1928 |
| 1,959,418 | Fourress | May 22, 1934 |
| 2,353,821 | Fourress | July 18, 1944 |
| 2,369,608 | Salvaneschi | Feb. 13, 1945 |
| 2,649,133 | Just | Aug. 18, 1953 |

FOREIGN PATENTS

| | | |
|---|---|---|
| 171,435 | Austria | May 26, 1952 |
| 405,659 | Great Britain | Feb. 9, 1934 |